United States Patent
Sugimura et al.

(10) Patent No.: US 8,187,530 B2
(45) Date of Patent: May 29, 2012

(54) STEEL FOR HIGH-CLEANLINESS SPRING WITH EXCELLENT FATIGUE CHARACTERISTICS AND HIGH-CLEANLINESS SPRING

(75) Inventors: Tomoko Sugimura, Kobe (JP); Koichi Sakamoto, Kobe (JP); Yoshio Fukuzaki, Kobe (JP); Atsuhiko Yoshida, Kobe (JP); Takeshi Inoue, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 269 days.

(21) Appl. No.: 12/597,919

(22) PCT Filed: Mar. 27, 2008

(86) PCT No.: PCT/JP2008/055961
§ 371 (c)(1),
(2), (4) Date: Oct. 28, 2009

(87) PCT Pub. No.: WO2008/146533
PCT Pub. Date: Dec. 4, 2008

(65) Prior Publication Data
US 2010/0086432 A1 Apr. 8, 2010

(30) Foreign Application Priority Data

May 25, 2007 (JP) ................................. 2007-139202

(51) Int. Cl.
*C22C 38/02* (2006.01)
*C22C 38/04* (2006.01)
(52) U.S. Cl. ............ 420/84; 420/85; 420/117; 420/104; 420/105; 420/107; 420/108; 420/109; 420/111; 420/123; 420/126; 420/127; 148/320; 148/908; 148/333

(58) Field of Classification Search .................... 420/84, 420/85, 104–128; 148/320, 332–336, 580, 148/595, 596, 908
See application file for complete search history.

(56) References Cited

U.S. PATENT DOCUMENTS 7,429,301 B2    9/2008  Sugimura et al.
(Continued)

FOREIGN PATENT DOCUMENTS
EP        1 662 016 A1    5/2006
(Continued)

OTHER PUBLICATIONS

Machine-English translation of Japanese patent 2003-268437, Ekusa Norio et al., Sep. 25, 2003.*

(Continued)

*Primary Examiner* — Deborah Yee
(74) *Attorney, Agent, or Firm* — Oblon, Spivak, McClelland, Maier & Neustadt, L.L.P.

(57) ABSTRACT

An object of this invention is to provide a steel for high-cleanliness spring which is useful for the production of a spring excellent in fatigue characteristics in high Si steels. The steel for high-cleanliness spring with excellent fatigue characteristics according to the invention contains: in terms of mass %, C: 1.2% or less (excluding 0%); Si: 1.8% to 4%; Mn: 0.1% to 2.0%; and total Al: 0.01% or less (excluding 0%), with the remainder being iron and inevitable impurities, in which the Si amount and a solute (SIMS) Ca amount in the steel satisfy a relationship of the following expression (1):

$$\text{Si} \times 10^{-7} \leq \text{solute (SIMS) Ca} \leq \text{Si} \times 5 \times 10^{-7} \qquad (1)$$

(in which each of the solute (SIMS) Ca and Si represents the amount thereof (mass %) in the steel).

14 Claims, 1 Drawing Sheet

U.S. PATENT DOCUMENTS

| | | |
|---|---|---|
| 7,608,130 B2 | 10/2009 | Sakamoto et al. |
| 2006/0108027 A1 | 5/2006 | Sugimura et al. |
| 2006/0130946 A1 | 6/2006 | Minamida et al. |
| 2006/0156864 A1 | 7/2006 | Sakamoto et al. |
| 2007/0051432 A1 | 3/2007 | Kimura et al. |
| 2008/0202289 A1 | 8/2008 | Sakamoto et al. |
| 2008/0279714 A1 | 11/2008 | Hashimura et al. |
| 2009/0194204 A1 | 8/2009 | Sugimura et al. |
| 2009/0223610 A1 | 9/2009 | Kochi et al. |

FOREIGN PATENT DOCUMENTS

| | | |
|---|---|---|
| EP | 1 674 588 A1 | 6/2006 |
| JP | 62 99436 | 5/1987 |
| JP | 62 99437 | 5/1987 |
| JP | 63-140068 * | 6/1988 |
| JP | 63 140068 | 6/1988 |
| JP | 1-132740 | 5/1989 |
| JP | 5 320827 | 12/1993 |
| JP | 7-6037 | 1/1995 |
| JP | 09 310145 | 2/1997 |
| JP | 2000 239794 | 9/2000 |
| JP | 2000 345232 | 12/2000 |
| JP | 2002 167647 | 6/2002 |
| JP | 2006-342400 | 12/2006 |
| JP | 2009-275262 | 11/2009 |
| WO | WO 2006/059784 A1 | 6/2006 |

OTHER PUBLICATIONS

Extended European Search Report issued Mar. 24, 2011, European Patent Application No. 08739090.2.

* cited by examiner

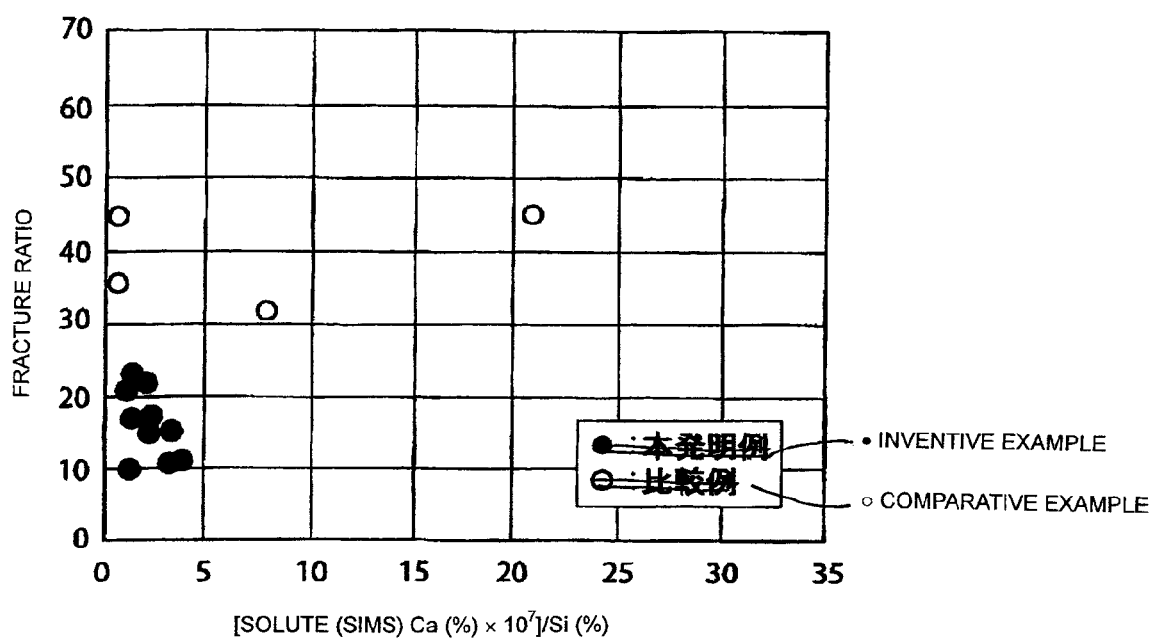

STEEL FOR HIGH-CLEANLINESS SPRING WITH EXCELLENT FATIGUE CHARACTERISTICS AND HIGH-CLEANLINESS SPRING

TECHNICAL FIELD

This invention relates to a steel for high-cleanliness spring with excellent fatigue characteristics, and a high-cleanliness spring. More specifically, this invention relates to a steel that is improved in fatigue characteristics due to a reduction of hard non-metallic inclusions having a remarkably small ductibility and is used for a high-cleanliness spring, and a high-cleanliness spring with excellent fatigue characteristics that is obtained by using the steel.

BACKGROUND ART

In recent years, along with an increase in demand of light weight and high output in the field of e.g., automobile, there has been a preference for high stress designing of a valve spring, a suspension spring, a clutch spring, and the like that are used for an engine and a suspension. Therefore, springs with excellent anti-fatigue property and anti-settling property have been strongly demanded in order to deal with an increase in applied stress. Particularly, since there has been a considerably strong demand for the increase in fatigue strength of the valve spring, there is a difficulty in meeting such demand even by employing SWOSC-V (JIS G 3566) that is said to have high fatigue strength among conventional steels.

In the spring steel that is required to have high fatigue strength, it is necessary to reduce hard non-metallic inclusions present in steel materials as small as possible. From such a view point, a high-cleanliness steel that is reduced in non-metallic inclusions as small as possible is generally used as a steel material for the above-described usage. Since the risk of wire breakage and fatigue fracture caused by the non-metallic inclusions becomes increased along with an increase in strength of the material, a demand for a reduction and downsizing of the non-metallic inclusions that are the main cause of such wire breakage and fatigue fracture has become markedly severer.

From the view point of achieving the reduction and downsizing of the hard non-metallic inclusions in a steel, various technologies have been proposed so far. For example, in Patent Publication 1, a high-cleanliness steel that is improved in cold processability and fatigue characteristics was realized by defining a composition of a non-metallic inclusion in order that the non-metallic inclusion is drawn well during hot rolling and finely dispersed by pulverization in a cold drawing or wire drawing step. Further, Patent Publication 2 defines a composition of a non-metallic inclusion that is easily drawn and formed into fine particles by hot rolling, cold rolling, and wire drawing.

On the other hand, Patent Publication 3 discloses a technology in which a melting point of an oxide-based inclusion is maintained to 1500° C. so that the inclusion becomes a low melting point composition that is easily drawn during hot rolling and cold rolling.

Patent Publication 4 defines a low melting point inclusion that is easily drawn during hot rolling and cold rolling, which is obtained by causing an $Al_2O_3$—SiO—MnO system to include MgO and/or CaO.

Further, focusing on a dissolved component in a steel in view of the fact that it is not always possible to prevent fatigue breakage only with the control of the conventional inclusion composition, Patent Publication 5 discloses a technology of improving fatigue characteristics by defining solute amounts of Al, Ca, and the like in a steel.

Patent Publication 1: JP-A-62-99436
Patent Publication 2: JP-A-62-99437
Patent Publication 3: JP-A-5-320827
Patent Publication 4: JP-A-63-140068
Patent Publication 5: JP-A-9-310145

DISCLOSURE OF THE INVENTION

Problems that the Invention is to Solve

However, even with the control on the dissolved component as disclosed in Patent Publication 5, a steel may be lead to breakage in some cases. Such phenomenon is particularly prominent in the case where a test stress in a fatigue test is high in a steel that is required to have high fatigue strength and cannot be satisfactorily dealt with the technology disclosed in the above-listed patent publications.

On the other hand, since there has been a demand for high strength of the spring steel, there is a tendency to increase the Si concentration in a steel. Therefore, achievement of high fatigue characteristics in high Si steel has become a considerably important issue.

This invention has been accomplished under the above-described circumstances, and an object thereof is to provide a high-cleanliness steel useful for reliably obtaining a spring excellent in fatigue characteristics in high Si steels, and a high-cleanliness spring with excellent fatigue characteristics that is obtainable by using the steel.

Means for Solving the Problems

A steel for high-cleanliness spring with excellent fatigue characteristics according to this invention contains:
in terms of mass %,
C: 1.2% or less (excluding 0%);
Si: 1.8% to 4%;
Mn: 0.1% to 2.0%; and
total Al: 0.01% or less (excluding 0%),
with the remainder being iron and inevitable impurities,
in which the Si amount and a solute (SIMS) Ca amount in the steel satisfy a relationship of the following expression (1):

$$Si \times 10^{-7} \leq \text{solute (SIMS) Ca} \leq Si \times 5 \times 10^{-7} \tag{1}$$

(in which each of the solute (SIMS) Ca and Si represents the amount thereof (mass %) in the steel).

The steel for high-cleanliness spring may further contains as other element:

(a) at least one element selected from the group consisting of
Cr: 3% or less (excluding 0%),
Mo: 0.5% or less (excluding 0%),
W: 0.5% or less (excluding 0%), and
Co: 0.5% or less (excluding 0%);

(b) at least one element selected from the group consisting of
V: 0.5% or less (excluding 0%),
Nb: 0.1% or less (excluding 0%), and
Ti: 0.1% or less (excluding 0%);

(c) Cu: 0.1% or less (excluding 0%) and/or Ni: 0.5% or less (excluding 0%);

(d) 0.1 to 50 ppm of REM; and (e) at least one element selected from the group consisting of an alkali metal element, Ba, and Sr in a total amount of 0.1 to 50 ppm.

This invention also includes a high-cleanliness spring with excellent fatigue characteristics that is obtainable by using the spring steel.

Advantage of the Invention

According to this invention, since it is possible to considerably suppress $SiO_2$ and a composite inclusion having a high $SiO_2$ ratio that are difficult to be deformed during hot rolling and tends to remain coarse after the hot rolling, it is possible to achieve high strength by performing severe wire drawing processing as well as to realize a steel for high-cleanliness spring that enables the production of a spring with excellent fatigue characteristics.

BRIEF DESCRIPTION OF THE DRAWING

FIG. 1 is a graph showing a relationship between [solute (SIMS) Ca (%)×$10^7$]/Si (%) and a fracture ratio.

BEST MODE FOR CARRYING OUT THE INVENTION

The inventors have conducted studies for obtaining a spring steel suitable for production of a spring that exhibits excellent fatigue characteristics. As a result, it was found that generation of a hard inclusion having a high $SiO_2$ concentration is accelerated along with an increase in Si concentration in a steel, and that the hard inclusion serves as a point of origin of breakage. However, since the use of the steel having high Si concentration has been increased along with an increase in demand for high strength of spring steels, there has been an eager demand for a spring steel with excellent fatigue characteristics even though it is a high Si steel. Under the above-described circumstances, the inventors have conducted further studies. As a result, it was found that, when a solute (SIMS) Ca amount with respect to a Si amount in the steel is controlled, it is possible to obtain a spring steel that is remarkably high in fatigue strength even though it is a high Si steel, thereby accomplishing this invention.

More specifically, the Si amount and the solute (SIMS) Ca amount in the steel are adjusted to satisfy a relationship of the following expression (1):

$$Si \times 10^{-7} \leq \text{solute (SIMS) Ca} \leq Si \times 5 \times 10^{-7} \quad (1)$$

(in which each of the solute (SIMS) Ca and Si represents the content thereof (mass %) in the steel).

FIG. 1 is a graph obtained by plotting experimental results (Tables 1 and 2) described in column of Examples described later in this specification and investigating influences of [solute (SIMS) Ca (%)×$10^7$]/Si (%) to be exerted on a fracture ratio. In FIG. 1, each of the solute (SIMS) Ca and Si represents the content thereof (mass %) in the steel.

In FIG. 1, ● indicates examples of this invention in which the solute (SIMS) Ca amount satisfies the range of the expression (1), and ○ indicates comparative examples in which the solute (SIMS) Ca amount does not satisfy the range of the expression (1). From FIG. 1, it is apparent that it is possible to reduce the fracture ratio by maintaining at least the solute (SIMS) Ca amount to $1 \times 10^{-7}$ times or more but $5 \times 10^{-7}$ times or less of the Si amount. It is inferable that the fracture ratio is increased when the solute (SIMS) Ca amount exceeds $5 \times 10^{-7}$ times of the Si amount due to generation of hard CaO.

From FIG. 1, according to this invention, it is apparent that the spring steel that is considerably improved in fatigue strength is obtained by satisfying the expression (1).

As described above, even when compositions of steels and average compositions of in-steel inclusions are identical to each other, a difference in fatigue characteristics is caused depending on the control of the solute (SIMS) Ca amount. By controlling the solute (SIMS) Ca amount as defined in this invention, it is possible to satisfactorily suppress generation of the disadvantageous $SiO_2$-based inclusion to thereby reliably improve the fatigue characteristics.

In order to obtain a steel material that satisfies the relationship between the solute (SIMS) Ca amount and the Si amount of the expression (1), in particular, a stirring time during slag refining is made longer than that of an ordinary slag refining to approximate dissolved components in a liquid steel by equilibrium with the slag.

The inclusion control by slag inclusion that has been performed as an ordinarily method is performed in a non-equilibrium state. However, according to such a method, even in the case of trying to suppress the generation of the disadvantageous $SiO_2$-based inclusion by adding the slag, Ca, or the like, the $SiO_2$-based inclusion tends to be easily generated during setting when a reaction between the liquid steel and the inclusion largely deviates from the equilibrium. In particular, in the case of a high Si steel, $SiO_2$-based inclusion tends to generate easier.

Accordingly, according to this invention, a solute Ca concentration in a liquid steel is increased by conducting a stirring for a long time in the slag refining as mentioned above to thereby approximate a reaction between dissolved components and slag components in the liquid steel to an equilibrium state, so that the dissolved oxygen reacts with the dissolved Ca, thereby making it possible to satisfactorily control the generation of $SiO_2$-based inclusion.

In this invention, the components in the steel materials containing 1.8% or more of Si are controlled, and other components are contained as in ordinary spring steels as described below. Since embrittlement of the steel material is easily caused when Si is contained excessively, amount of Si is suppressed to 4% or less.

C is a useful element for ensuring high strength, and an amount thereof to be contained may be 0.2% or more, preferably 0.3% or more, more preferably 0.4% or more in order to cause the effect to be exhibited. However, since the steel becomes brittle to be impractical when the C amount is excessive, the C amount is suppressed to 1.2% or less.

Mn is an element having a deacidification action as well as an inclusion control action. In order to cause the actions to be effectively exhibited, 0.1% or more of Mn is contained. However, since the steel becomes brittle to be impractical when the Mn amount is excessive, the Mn amount is suppressed to 2.0% or less.

Al is a useful element for inclusion control, and about 0.0001% of a total Al is required. However, when the total Al amount is too large, since there is a possibility that crude $Al_2O_3$ which is the cause of wire breakage is generated due to an increase in $Al_2O_3$ concentration in the inclusion, the total Al amount is suppressed to 0.01% or less.

The contained elements defined in this invention are as described above, and the remainder are iron and inevitable impurities. Contaminants such as elements that can be included depending on types of materials, resources, production equipments, and the like are acceptable as the inevitable impurities. Further, it is effective for further improving the characteristics by actively containing the following elements.

<At least one element selected from the group consisting of Cr: 3% or less (excluding 0%), Mo: 0.5% or less (excluding 0%), W: 0.5% or less (excluding 0%), and Co: 0.5% or less (excluding 0%)>

These elements are effective for improving softening resistance, and it is preferable to contain 0.5% or more of Cr, 0.05% or more of Mo, 0.05% or more of W, and 0.01% or more of Co in order to cause the effect to be exhibited. However, since hardenability becomes too high to be subject to fracture when the elements are excessive, Cr, Mo, W, and Co amounts may preferably be suppressed to 3% or less, 0.5% or less, 0.5% or less, and 0.5% or less, respectively.

<At least one element selected from the group consisting of V: 0.5% or less (excluding 0%), Nb: 0.1% or less (excluding 0%), and Ti: 0.1% or less (excluding 0%)>

These elements are effective for fining grains, and it is preferable to contain 0.01% or more of V, 0.01% or more of Nb, and 0.01% or more of Ti in order to cause the effect to be exhibited. However, a crude nitride is generated to reduce fatigue strength when these elements are excessive. Therefore, V, Nb, and Ti amounts may preferably be suppressed to 0.5% or less, 0.1% or less, and 0.1% or less, respectively.

<Cu: 0.1% or less (excluding 0%) and/or Ni: 0.5% or less (excluding 0%)>

These elements are effective for suppressing embrittlement at a low temperature, and it is preferable to contain 0.05% or more of Ni and 0.01% or more of Cu in order to cause the effect to be exhibited.

However, since the effect is saturated when the elements are contained in an excessive amount, Ni and Cu amounts may be suppressed to 0.5% or less and 0.1% or less, respectively, from the economic point of view.

<0.1 to 50 ppm of REM>

REM (rare earth element such as Ce and La) has an action of softening the non-metallic inclusion in the steel. In order cause the effect to be exhibited, it is preferable to contain 0.1 ppm or more of REM. However, since the effect is saturated when the element is contained in an excessive amount, it is preferable to suppress REM amount to 50 ppm or less.

<At least one element selected from the group consisting of an alkali metal element, Ba, and Sr in a total amount of 0.1 to 50 ppm>

The alkali metal element (Li, Na, K, Rb, and Cs), Ba, and Sr have an action of softening the non-metallic inclusion in the steel. It is preferable to contain at least one of the elements in a total amount of 0.1 ppm or more in order to cause the effect to be exhibited. However, since the effect is saturated when the element is contained in an excessive amount, it is preferable to suppress the total amount thereof to 50 ppm or less.

Hereinafter, this invention will be described in more details in conjunction with examples. The nature of the examples is not for limiting this invention, and any of modifications made in accordance with the above and following descriptions is encompassed by the technical scope of this invention.

EXAMPLES

Various fluxes were added to about 500 kg of a liquid steel that was simulant to a steel withdrawn from a steel converter, and component adjustment and slag refining were performed. The slag composition (main components) was set as shown in Table 2, and a stirring time was changed as shown in Table 2 in order to change a concentration of a solute component (dissolved Ca). The liquid steel after the slag refining was casted into a mold, and hammering and hot rolling were performed on the obtained ingot to obtain a wire material having a diameter of 8.0 mm and the composition shown in Table 1.

TABLE 1

| Experiment No. | C % | Si % | Mn % | Cr % | Ni % | V % | Al % | Others | Total Ca % | Solute (SIMS) Ca % |
|---|---|---|---|---|---|---|---|---|---|---|
| 1 | 0.6 | 1.9 | 0.5 | 1.7 | — | — | 0.002 | — | 0.0002 | $4.1 \times 10^{-7}$ |
| 2 | 0.5 | 2.0 | 0.9 | 0.9 | — | — | 0.0008 | Ti: 0.1% | 0.0005 | $2.8 \times 10^{-7}$ |
| 3 | 0.4 | 2.1 | 0.7 | 0.7 | 0.2 | — | 0.0006 | — | 0.0007 | $7 \times 10^{-7}$ |
| 4 | 0.6 | 2.5 | 0.9 | — | 0.5 | 0.1 | 0.001 | — | 0.0002 | $3.3 \times 10^{-7}$ |
| 5 | 0.6 | 3.4 | 0.5 | — | 0.4 | 0.3 | 0.0006 | — | 0.0005 | $4.2 \times 10^{-7}$ |
| 6 | 0.4 | 2.1 | 0.7 | 0.7 | 0.2 | — | 0.0005 | W: 0.001% Ba: 2 ppm | 0.0007 | $8 \times 10^{-7}$ |
| 7 | 0.4 | 2.0 | 0.7 | 0.7 | — | — | 0.0005 | Sr: 2 ppm | 0.0007 | $7 \times 10^{-7}$ |
| 8 | 0.5 | 2.0 | 0.9 | 0.9 | — | — | 0.0006 | Mo: 0.1% Li: 0.5 ppm | 0.0005 | $2.8 \times 10^{-7}$ |
| 9 | 0.6 | 1.9 | 0.5 | 1.7 | — | — | 0.0025 | Nb: 0.01% Ce: 2 ppm | 0.0002 | $4.1 \times 10^{-7}$ |
| 10 | 0.6 | 1.9 | 0.5 | 1.7 | — | — | 0.0008 | Cu: 0.001% Na: 0.1 ppm | 0.0003 | $5 \times 10^{-7}$ |
| 11 | 0.6 | 1.8 | 0.9 | — | — | — | 0.0007 | — | 0.0005 | $1.2 \times 10^{-7}$ |
| 12 | 0.5 | 3.0 | 0.9 | — | — | — | 0.0005 | — | 0.0007 | $2.4 \times 10^{-7}$ |
| 13 | 0.6 | 1.45 | 0.7 | 0.7 | — | — | 0.0006 | — | 0.0006 | $30 \times 10^{-7}$ |
| 14 | 0.5 | 1.9 | 0.9 | 1.7 | — | — | 0.0006 | — | 0.0007 | $15 \times 10^{-7}$ |
| 15 | 0.5 | 2.2 | 0.7 | — | — | 0.3 | 0.0006 | — | 0.0005 | $1.5 \times 10^{-7}$ |

* Remainder is iron and inevitable impurities, and % means mass %.

TABLE 2

| Experiment No. | Slag Component (mass %) | | | Stirring Time (minutes) | Remarks | Average Composition of Inclusion (mass %) | | | | | Fatigue Test Fracture Ratio (%) |
|---|---|---|---|---|---|---|---|---|---|---|---|
| | $Al_2O_3$ | $SiO_2$ | CaO | | | MgO | $Al_2O_3$ | $SiO_2$ | CaO | MnO | |
| 1 | 14 | 56 | 22 | 300 | | 3 | 15 | 55 | 23 | 4 | 15 |
| 2 | 15 | 49 | 29 | 400 | | 1 | 17 | 51 | 29 | 2 | 23 |
| 3 | 13 | 44 | 36 | 330 | | 2 | 15 | 43 | 39 | 1 | 15 |
| 4 | 10 | 43 | 38 | 350 | | 4 | 10 | 44 | 38 | 4 | 10 |
| 5 | 9 | 50 | 33 | 420 | | 3 | 10 | 52 | 33 | 2 | 21 |

TABLE 2-continued

| Experiment No. | Slag Component (mass %) | | | Stirring Time (minutes) | Remarks | Average Composition of Inclusion (mass %) | | | | | Fatigue Test Fracture Ratio (%) |
|---|---|---|---|---|---|---|---|---|---|---|---|
| | $Al_2O_3$ | $SiO_2$ | CaO | | | MgO | $Al_2O_3$ | $SiO_2$ | CaO | MnO | |
| 6 | 13 | 43 | 35 | 330 | | 2 | 16 | 44 | 37 | 1 | 11 |
| 7 | 12 | 43 | 35 | 330 | | 2 | 16 | 44 | 37 | 1 | 11 |
| 8 | 15 | 49 | 29 | 400 | | 1 | 20 | 52 | 25 | 2 | 17 |
| 9 | 14 | 56 | 22 | 300 | | 3 | 15 | 55 | 23 | 4 | 17 |
| 10 | 13 | 54 | 22 | 300 | | 3 | 15 | 55 | 23 | 4 | 22 |
| 11 | 16 | 52 | 25 | 120 | | 3 | 18 | 51 | 26 | 2 | 36 |
| 12 | 12 | 45 | 35 | 130 | | 4 | 11 | 47 | 35 | 3 | 45 |
| 13 | 9 | 36 | 45 | 200 | | 2 | 13 | 42 | 42 | 1 | 45 |
| 14 | 10 | 43 | 36 | 70 | Ca was added | 2 | 10 | 44 | 42 | 2 | 32 |
| 15 | 20 | 41 | 23 | 150 | | 3 | 25 | 50 | 19 | 3 | 36 |

Compositions and average compositions of inclusions of the obtained wire materials were measured, and fatigue characteristics were evaluated. The measurement and evaluation methods are as described below.

<Solute (SIMS) Ca Amount Measurement>

An L-section (section including axial center) of each of the wire materials was irradiated by using SIMS (Secondary Ionization Mass Spectrometer; ims5f manufactured by CAMECA) under the conditions described below, and a solute (SIMS) Ca amount was detected by mass analysis of Ca ions discharged from the wire material section.

<SIMS Analysis Conditions>
Primary Ion Condition: $O^{2+}$-8 keV-100 nA
Irradiation Region: 80 μm×80 μm
Analyzed Region: φ 8 μm
Sample Chamber Evacuation Degree: $6×10^{-10}$ Torr The total Al amount was analyzed by ICP (Inductively Coupled Plasma) mass analysis, and the total Ca amount was analyzed by frameless atomic absorption spectrometry.

<Inclusion Composition Measurement>

The L-section of each of the wire materials was polished to subject 30 pieces of oxide-based inclusion having a shorter diameter of 3 μm or more present on a surface layer side from a part at ¼ of a diameter (½ of radius) to composition analysis by EPMA (Electron Probe MicroAnalyzer) (analysis conditions are as described below), and conversion into an oxide concentration was performed to detect an average composition of the 30 pieces of oxide-based inclusion.

EPMA apparatus: JXA-8621MX manufactured by JEOL, Ltd.
Analysis apparatus (EDS): TN-5500 manufactured by Tracor Northern
Accelerated Voltage: 20 kV
Scanning Current: 5 nA (nano-ampere)
Measurement Method: Quantitative analysis by energy dispersion analysis [Pabric Scan (whole region of particle was measured)]

<Fatigue Characteristics Evaluation>

After subjecting each of the wire materials (8.0 mm φ)) to stripping, patenting, cold wiredrawing (drawing), oil tempering, treatment corresponding to buckle elimination and annealing, shot peening, and buckle elimination and annealing in this order, a wire of 4.0 mm φ×650 mm was obtained as a sample piece, and a rotary bending test was performed using a Nakamura type rotary bending test machine under the conditions of a test stress: nominal stress of 908 MPa, rotation speed: 4000 to 5000 rpm, and number of halts: $2×10^7$. Among the test pieces that was broken during the test, the number of test pieces that were fractured due to the inclusions (fracture can occur from a wire surface not because of inclusions, and such case was not counted) was counted to measure a fracture ratio by the following expression.

Fracture ratio=[inclusion fracture number/(inclusion fracture number+number of wires achieved until the number of halts)]×100%

Solute (SIMS) Ca amounts of the wire materials are shown in Table 1, and the average inclusion compositions and fatigue characteristics (fracture ratios) are shown in Table 2.

From the above results, the following observations are obtained (No. described below means Experiment No. in Tables).

It is apparent that, in the steel materials of Nos. 1 to 15 that are substantially identical in average inclusion composition, the steel materials of Nos. 1 to 10 that satisfy the requirements defined in this invention are excellent in fatigue strength. In contrast, the steel materials of Nos. 11 to 15 that do not satisfy the requirements defined in this invention are inferior in fatigue characteristics.

Industrial Applicability

The spring steel of this invention is useful for production of springs to be used in the fields of automobiles and industrial machines since the spring steel is excellent in drawing processability achieved by the suppression of the $SiO_2$-based inclusion and ensures excellent fatigue characteristics. Particularly, the spring steel is optimum for production of springs and the like to be used for a restoring mechanism of a machine, such as a valve spring, a brake spring, and a suspension spring for automobile engine, which are required to have considerably high fatigue characteristics.

While the present invention has been described in detail and with reference to specific embodiments thereof, it will be apparent to one skilled in the art that various changes and modifications can be made therein without departing from the scope thereof. This application is based on Japanese patent application No. 2007-139202 filed on May 25, 2007, the entire contents thereof being hereby incorporated by reference.

The invention claimed is:

1. A steel, comprising:
in terms of mass %,
C: 1.2% or less (excluding 0%);
Si: 1.8% to 4%;
Mn: 0.1% to 2.0%; and
total Al: 0.01% or less (excluding 0%), and
iron and inevitable impurities,
wherein the Si amount and a solute (SIMS) Ca amount in the steel satisfy a relationship of following expression (1):

$$Si×10^{-7} \leq \text{solute (SIMS) Ca} \leq Si×5×10^{-7} \qquad (1)$$

(wherein each of the solute (SIMS) Ca and Si represents the amount thereof (mass %) in the steel).

2. The steel according to claim 1, further comprising:
at least one element selected from the group consisting of
Cr: 3% or less (excluding 0%),
Mo: 0.5% or less (excluding 0%),
W: 0.5% or less (excluding 0%), and
Co: 0.5% or less (excluding 0%).

3. The steel according to claim 1, further comprising:
at least one element selected from the group consisting of
V: 0.5% or less (excluding 0%),
Nb: 0.1% or less (excluding 0%), and
Ti: 0.1% or less (excluding 0%).

4. The steel according to claim 1, further comprising:
at least one of Cu: 0.1% or less (excluding 0%) and Ni: 0.5% or less (excluding 0%).

5. The steel according to claim 1, further comprising:
0.1 to 50 ppm of REM.

6. The steel according to claim 1, further comprising:
at least one element selected from the group consisting of an alkali metal element, Ba, and Sr in a total amount of 0.1 to 50 ppm.

7. A high-cleanliness spring comprising the steel according to claim 1.

8. The steel according to claim 2, further comprising at least one element selected from the group consisting of
V: 0.5% or less (excluding 0%),
Nb: 0.1% or less (excluding 0%), and
Ti: 0.1% or less (excluding 0%).

9. The steel according to claim 2, further comprising: at least one of Cu:
0.1% or less (excluding 0%) and Ni: 0.5% or less (excluding 0%).

10. The steel according to claim 3, further comprising at least one of Cu: 0.1% or less (excluding 0%) and Ni: 0.5% or less (excluding 0%).

11. The steel according to claim 9, further comprising: at least one element selected from the group consisting of an alkali metal element, Ba and Sr in a total amount of 0.1 to 50 ppm.

12. The steel according to claim 2, further comprising: at least one element selected from the group consisting of an alkali metal element, Ba, and Sr in a total amount of 0.1 to 50 ppm.

13. The steel according to claim 8, further comprising: 0.1 to 50 ppm of REM.

14. The steel according to claim 1, further comprising: Cr: higher than 0.9% and 3% or less (excluding 0%).

* * * * *